(12) United States Patent
Kim et al.

(10) Patent No.: US 9,730,060 B2
(45) Date of Patent: Aug. 8, 2017

(54) METHOD AND SYSTEM FOR TRANSFERING PROFILES OF AUTHENTICATION MODULE

(71) Applicant: KT CORPORATION, Seongnam-si, Gyeonggi-do (KR)

(72) Inventors: Kwanlae Kim, Suwon-si (KR); Chul-Hyun Park, Yongin-si (KR); Jin-Hyoung Lee, Seongnam-si (KR); Hyung-Jin Lee, Seoul (KR)

(73) Assignee: KT Corporation, Seongnam (KR)

( * ) Notice: Subject to any disclaimer, the term of this patent is extended or adjusted under 35 U.S.C. 154(b) by 75 days.

(21) Appl. No.: 13/918,233

(22) Filed: Jun. 14, 2013

(65) Prior Publication Data

US 2014/0073292 A1    Mar. 13, 2014

(30) Foreign Application Priority Data

Jun. 15, 2012  (KR) .................. 10-2012-0064521
Sep. 7, 2012   (KR) .................. 10-2012-0099087
Jun. 10, 2013  (KR) .................. 10-2013-0065995

(51) Int. Cl.
*H04M 1/66*  (2006.01)
*H04W 12/06* (2009.01)
*H04W 8/18*  (2009.01)

(52) U.S. Cl.
CPC ............ *H04W 12/06* (2013.01); *H04W 8/18* (2013.01)

(58) Field of Classification Search
CPC ........ G06F 21/70; G06F 21/606; G06F 21/78; G06F 1/14021; H04L 63/0428
USPC ............ 455/411, 433, 432.1, 41.1, 558, 410, 455/432.2, 446.1, 436, 560, 561, 450, 455/452.2; 726/3, 4, 5, 6, 7; 370/352, 370/338, 328, 401; 709/217, 203, 250, 709/246, 220, 230, 227
See application file for complete search history.

(56) References Cited

U.S. PATENT DOCUMENTS

2007/0218945 A1 *  9/2007  Agami et al. ................. 455/558
2007/0287455 A1 * 12/2007  Hsu ....................... H04W 60/00
                                                    455/435.1
2008/0261561 A1 * 10/2008  Gehrmann ............ H04W 8/205
                                                    455/411
2009/0239503 A1 *  9/2009  Smeets ................... H04L 63/06
                                                    455/411

(Continued)

FOREIGN PATENT DOCUMENTS

KR     10-0474290 B1     2/2005
KR     10-2006-0046243 A  5/2006

*Primary Examiner* — Marcos Batista
(74) *Attorney, Agent, or Firm* — Sughrue Mion, PLLC

(57) ABSTRACT

A system for transferring a profile that is stored at an authentication module includes: a first terminal that includes a first authentication module and that operates based on a user profile that is stored at the first authentication module; a second terminal that includes a second authentication module and that requests the user profile by transmitting a first message including user identification information; and a management server that receives the first terminal and that acquires a profile that is stored at the first terminal based on user identification information and that transmits the acquired profile to the second terminal, wherein the first terminal exports the stored profile, and the second terminal installs a profile, having received from the management server at the second authentication module.

17 Claims, 11 Drawing Sheets

(56) References Cited

U.S. PATENT DOCUMENTS

| | | | |
|---|---|---|---|
| 2010/0015975 A1* | 1/2010 | Issa | H04L 63/102 |
| | | | 455/435.1 |
| 2012/0042042 A1* | 2/2012 | Winkler | H04L 63/102 |
| | | | 709/217 |
| 2012/0108204 A1* | 5/2012 | Schell et al. | 455/411 |
| 2012/0108207 A1* | 5/2012 | Schell et al. | 455/411 |
| 2012/0157040 A1* | 6/2012 | Naito et al. | 455/406 |
| 2012/0190354 A1* | 7/2012 | Merrien et al. | 455/422.1 |
| 2012/0302284 A1* | 11/2012 | Rishy-Maharaj | H04W 12/04 |
| | | | 455/552.1 |
| 2013/0217365 A1* | 8/2013 | Ramnani | H04L 67/306 |
| | | | 455/414.1 |

* cited by examiner

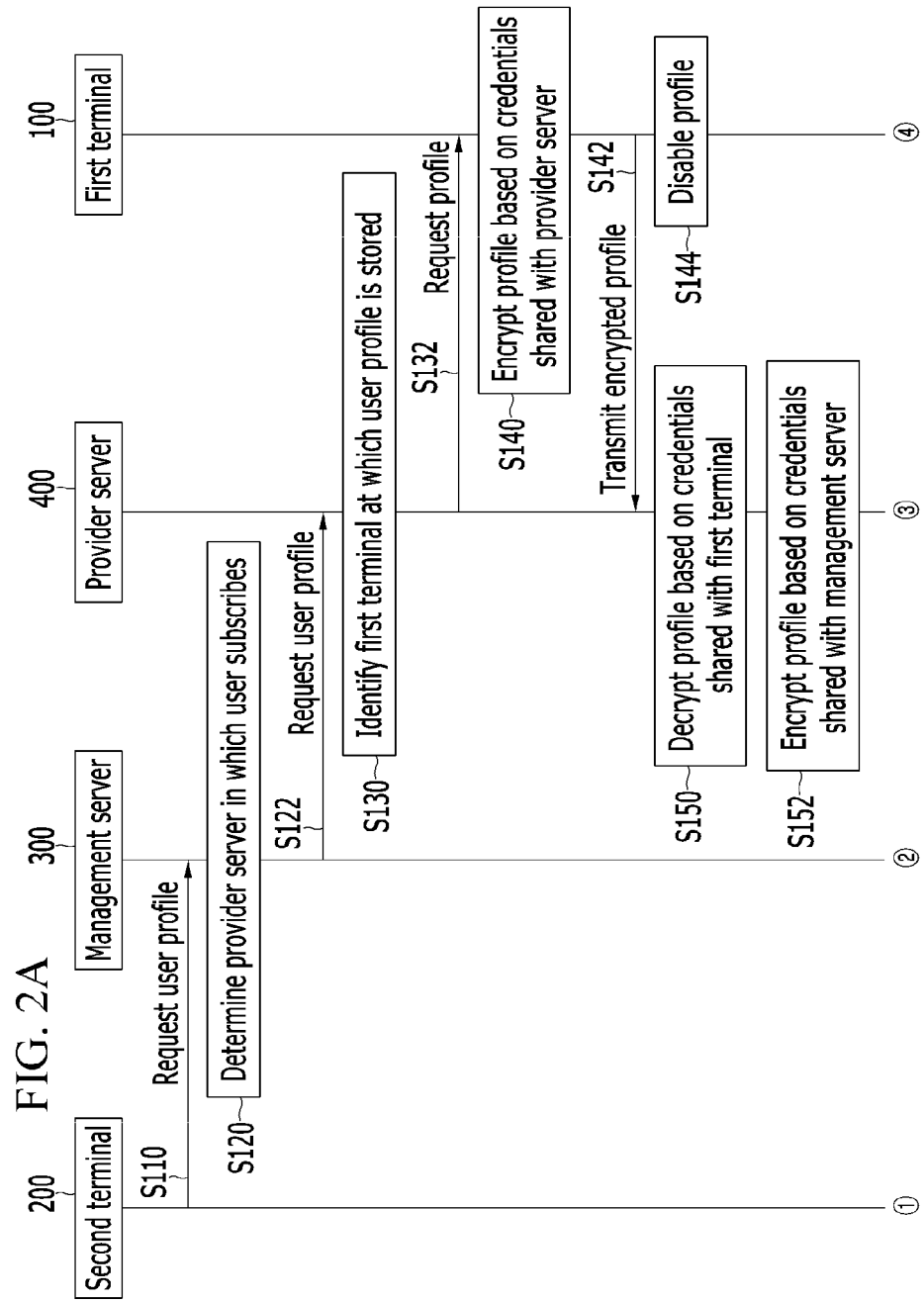

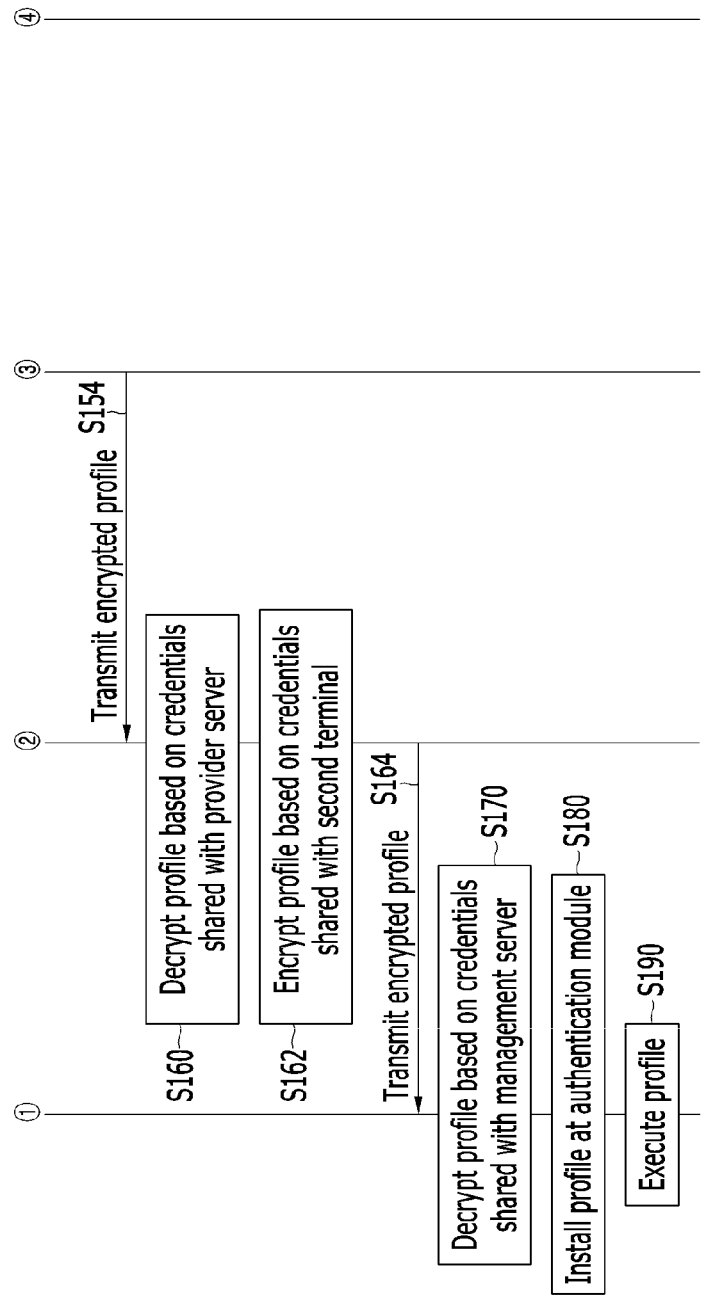

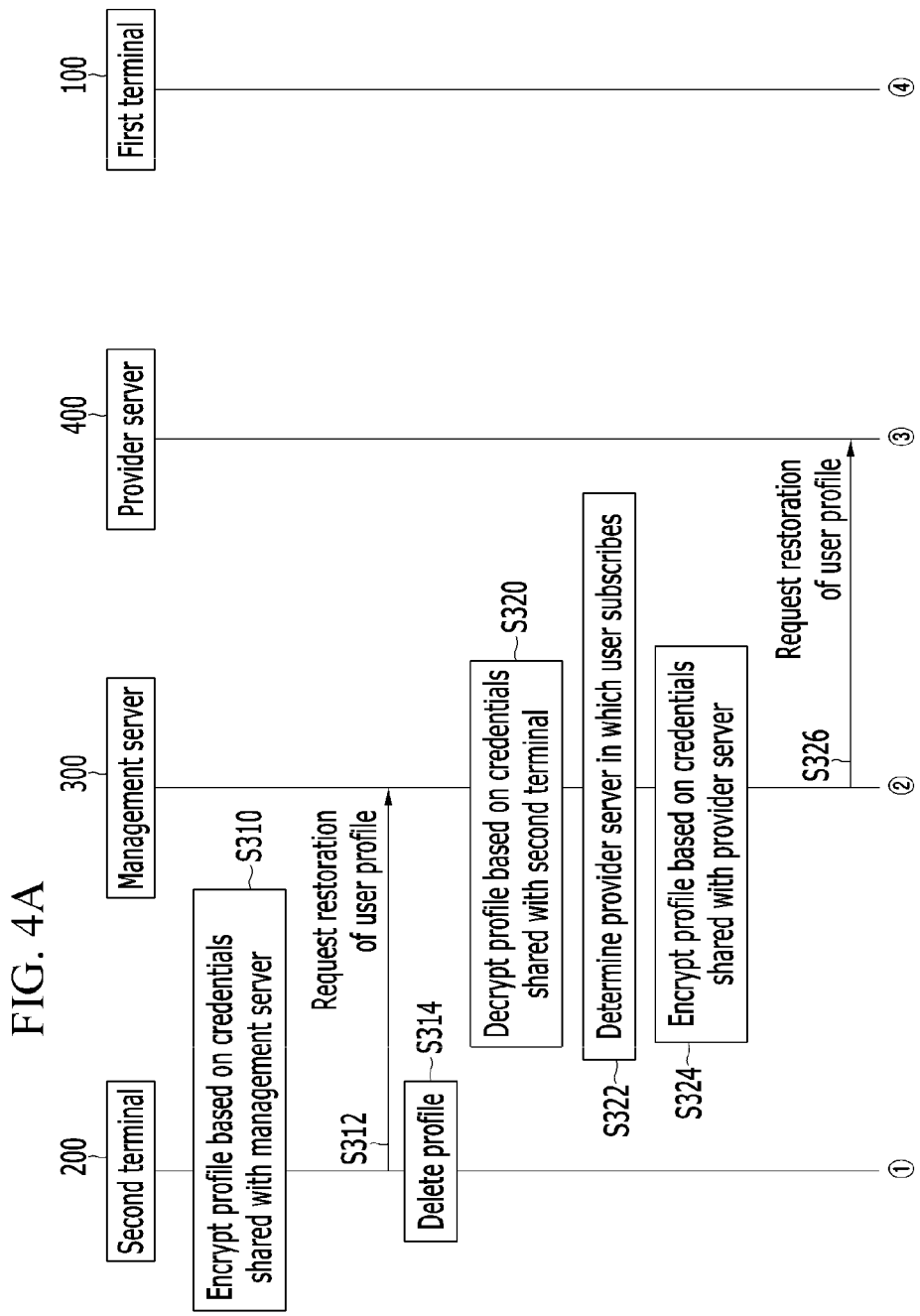

METHOD AND SYSTEM FOR TRANSFERING PROFILES OF AUTHENTICATION MODULE

CROSS-REFERENCE TO RELATED APPLICATION

This application claims priority to and the benefit of Korean Patent Application No. 10-2012-0064521, 10-2012-0099087, and 10-2013-0065995 filed in the Korean Intellectual Property Office on Jun. 15, 2012, Sep. 7, 2012, and Jun. 10, 2013, the entire contents of which are incorporated herein by reference.

BACKGROUND (a) Field of the Invention

The present invention relates to a method and system for transferring a profile of an authentication module.

(b) Description of the Related Art

A universal integrated circuit card (UICC) is a smart card that is inserted into a terminal and is a module for user authentication. The UICC can store a profile including a user's personal information and provider information of a mobile communication provider in which a user subscribes. For example, the UICC may include international mobile subscriber identity (IMSI) for identifying a user. The UICC is called a subscriber identity module (SIM) card in a global system for mobile (GSM) method and a universal subscriber identity module (USIM) card in a wideband code division multiple access (WCDMA) method.

A terminal performs user authentication using information that is stored at the UICC. Therefore, a user can conveniently communicate, authenticate, and pay using the UICC. Further, when the user replaces a terminal, the user inserts an UICC of an existing terminal into a new terminal. Therefore, by replacing a detachable UICC, the user can transfers the user's personal information and mobile communication provider information to a new apparatus.

Nowadays, a communication terminal such as machine to machine (M2M) is produced in a small size. At such a terminal, instead of a detachable UICC, an embedded UICC (eUICC) is mounted. The eUICC cannot be physically removed from a terminal or inserted into a terminal, unlike the detachable UICC. Therefore, it is difficult to transfer a profile that is stored at the UICC to another embedded UICC or another repository.

SUMMARY

The present invention has been made in an effort to provide a method and system having advantages of transferring a profile of an authentication module.

An exemplary embodiment of the present invention provides a system for transferring a profile that is stored at an authentication module, the system including: a first terminal that includes a first authentication module and that operates based on a user profile that is stored at the first authentication module; a second terminal that includes a second authentication module and that requests the user profile by transmitting a first message including user identification information; and a management server that receives the first terminal and that acquires a profile that is stored at the first terminal based on user identification information and that transmits the acquired profile to the second terminal, wherein the first terminal exports the stored profile, and the second terminal installs a profile, having received from the management server at the second authentication module.

The system may further include a provider server that is connected to the first terminal based on the profile, wherein the provider server may search for the provider server based on the user identification information and transmit a second message that requests a profile corresponding to the user identification information to the provider server.

The provider server may receive the second message, search for the first terminal based on the user identification information, transmit a third message that requests a profile to the first terminal, and transmit a profile, having received from the first terminal to the management server.

The first terminal may encrypt a profile that is stored at the authentication module based on a first credential that shares with the provider server and transmit the encrypted profile to the provider server.

The provider server may decrypt a received profile based on the first credential.

The provider server may encrypt the decrypted profile based on a second credential that shares with the management server and transmit the encrypted profile to the management server.

The management server may encrypt a profile that transmits to the second terminal based on a third credential that shares with the second terminal.

The second terminal may decrypt a received profile based on the third credential.

The second terminal may export the stored profile to the first terminal by transmitting a profile that is stored at the second authentication module to the management server and delete the stored profile.

Another embodiment of the present invention provides a method in which a terminal transfers a profile that is stored at an authentication module, the method including: receiving a profile request message from a server; encrypting a first profile that is stored at the authentication module based on credentials; transmitting the encrypted first profile to the first server; and disabling the first profile that is stored at the authentication module.

The credential may be a key in which the terminal uses for loading, installing, or managing a profile.

The method may further include: receiving an encrypted second profile from the server; decrypting the received second profile based on the credentials; and installing information of the decrypted second profile at the authentication module.

Yet another embodiment of the present invention provides a method in which a terminal transfers a profile that is stored at an authentication module, the method including: transmitting a profile request message including user identification information to a server; receiving an encrypted profile from the server; decrypting the profile based on credentials sharing with the server; and installing the decrypted profile at an authentication module.

The credentials may be a value in which the terminal and the server share.

The method may further include: encrypting a profile that is stored at the authentication module based on the credentials; transmitting a profile restoration message including the encrypted profile to the server; and deleting a profile that is stored at the authentication module.

According to an exemplary embodiment of the present invention, even if a user cannot physically detach an embedded authentication module, the user can freely transfer a profile between the embedded authentication modules. According to an exemplary embodiment of the present invention, because the user can import a profile to a desired terminal, the user can use a plurality of terminals in the same environment.

BRIEF DESCRIPTION OF THE DRAWINGS

FIGS. 2A, 2B, and 3 are flowcharts illustrating a method of acquiring a profile according to an exemplary embodiment of the present invention.

FIGS. 4A, 4B, and 5 are flowcharts illustrating a method of restoring a profile according to another exemplary embodiment of the present invention.

DETAILED DESCRIPTION OF THE EMBODIMENTS

Figure 1:
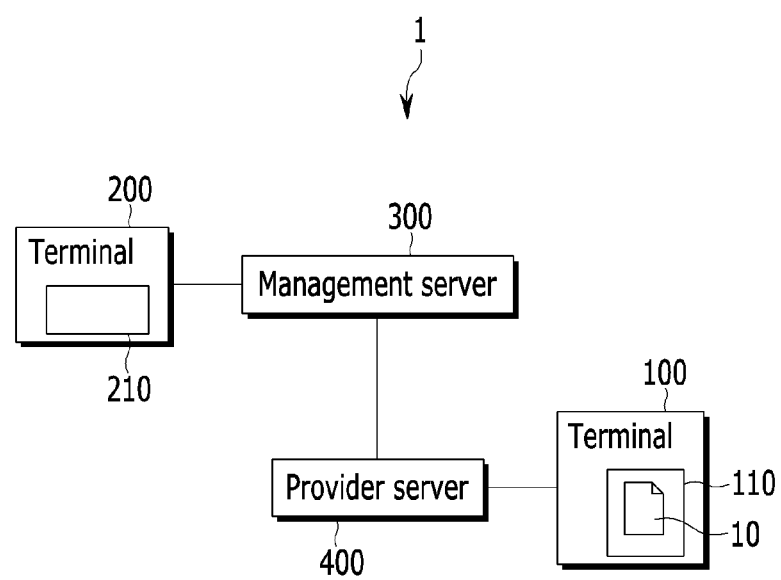
FIG. 1 is a diagram illustrating a communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements.

FIG. 1 is a diagram illustrating a communication system according to an exemplary embodiment of the present invention.

Referring to FIG. 1, a communication system 1 includes a first terminal 100, a second terminal 200, a management server 300, and at least one provider server 400. The management server 300 performs management for safely transferring a profile. The management server 300 may be a subscriber management server (SMS). The provider server 400 may be a server of a mobile network operator (MNO). The management server 300 and the provider server 400 may be integrated.

The first terminal 100 and the second terminal 200 include authentication modules 110 and 210, respectively. The authentication module may be replaced with various terms such as an authorization module, a certification module, a subscriber identification module, a subscriber identification module card, and a universal subscriber identification module. The authentication module 110/210 may be an embedded authentication module that is embedded in the terminal 100/200. The embedded authentication module 110/210 cannot be removed by being separated from the terminal 100/200. The embedded authentication module that is mounted in the terminal cannot be replaced with another embedded authentication module. Here, the embedded authentication module may be embedded universal integrated circuit card (eUICC).

The authentication module 110/210 stores profiles. The profile includes various information related to terminal operation such as user authentication information. The profile may include a user's personal information and provider information of a communication provider in which a user subscribes. The terminal performs user authentication or terminal authentication using profiles.

A profile 10 may be installed at the authentication module 110 of the first terminal 100, and the authentication module 210 of the second terminal 200 may be empty. In this case, the second terminal 200 imports a profile from the first terminal 100 through the management server 300 and the provider server 400, and the first terminal 100 exports a profile to the second terminal 200 through the management server 300 and the provider server 400. That is, when the user replaces a terminal, an authentication module is not replaced, a profile that is stored at the authentication module is transferred.

The first terminal 100 transmits the profile 10 to the second terminal 200 through the management server 300 and the provider server 400. The first terminal 100, having transmitted the profile 10 disables the profile 10. The second terminal 200, having received the profile 10 installs the profile 10 at the authentication module 210 and enables the profile 10. That is, the profile is activated only in one terminal.

The second terminal 200 transmits the profile 10 to the first terminal 100, which is an original position. The second terminal 200, having transmitted the profile 10 deletes the profile 10. The first terminal 100, having received the profile 10 activates the profile 10.

The management server 300 and the provider server 400 are positioned between the second terminal 200 and the first terminal 100 and transfer the profile. For this purpose, the second terminal 200 and the management server 300, the management server 300 and the provider server 400, and the provider server 400 and the first terminal 100 communicate. In this case, transmission information in which communication subjects give and receive is encrypted based on credentials that are shared between the communication subjects. That is, the profile is encrypted, and transmitted at the outside of an authentication module.

Figure 3:
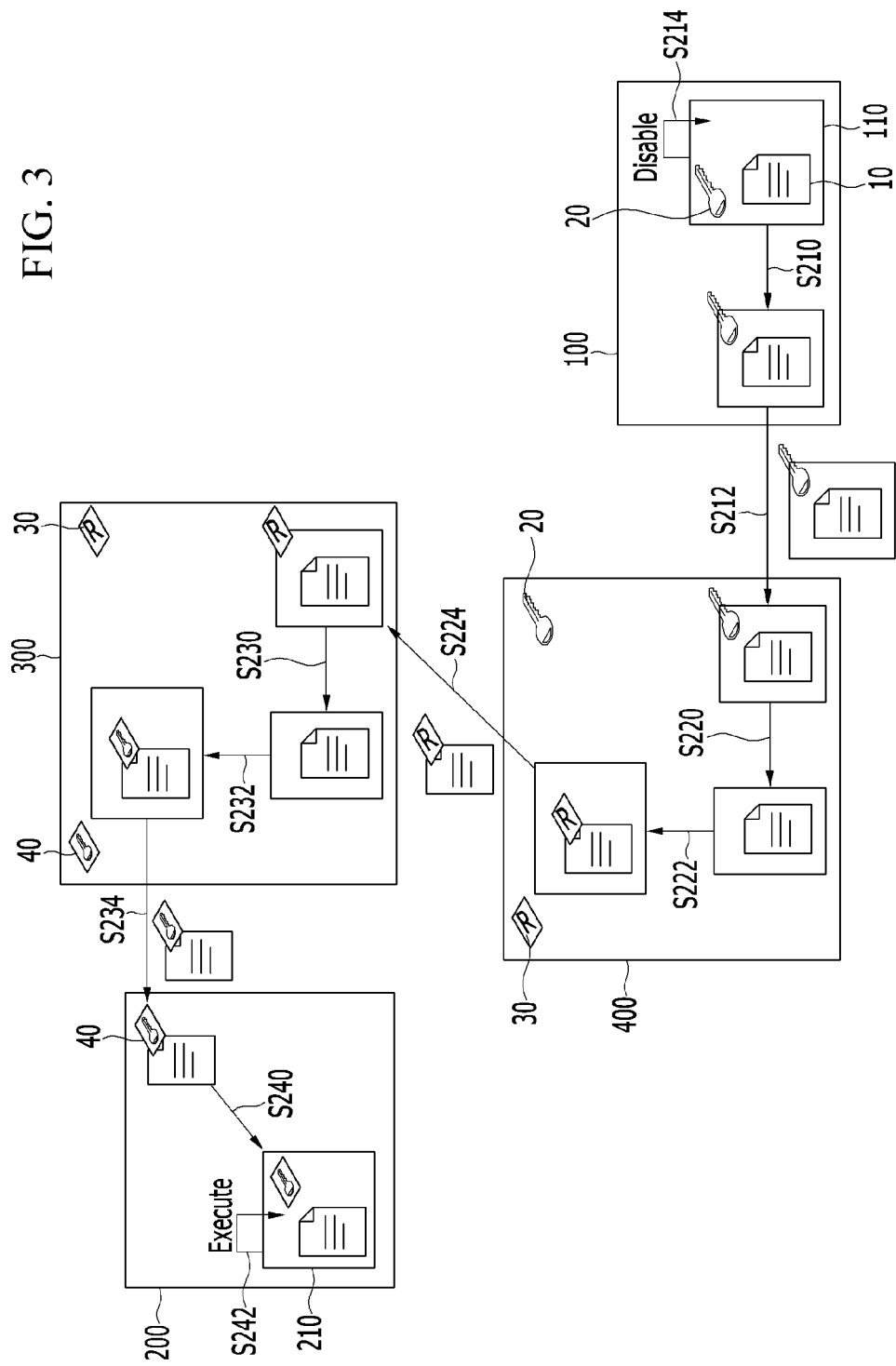

FIGS. 2 and 3 are flowcharts illustrating a method of acquiring a profile according to an exemplary embodiment of the present invention.

Referring to FIG. 2A, the second terminal 200 requests a user profile to the management server 300 (S110). The second terminal 200 transmits user identification information to authenticate a user that is related to a profile request. The second terminal 200 has initial information for connecting a management server. User identification information may be subscriber identification information. User identification information may be, for example, user credentials or terminal intrinsic information. User credentials may be, for example, identification (ID), a password, and an access token. Terminal intrinsic information may be, for example, international mobile subscriber identity (IMSI).

When requesting a profile, the management server 300 determines the provider server 400 in which a user subscribes based on transmitted user identification information (S120). For example, the management server 300 may use intrinsic identification information of a provider server such as ID/PW or IMSI information of a user.

The management server 300 requests a user profile to the provider server 400 (S122).

The provider server 400 identifies a registered terminal, i.e., the first terminal 100 at which a user profile is stored (S130). The first terminal 100 is connected to a communication provider network in which the user subscribes based on a user profile. Therefore, the provider server 400 that can identify a user of the terminal can know that a requested user profile is installed at the first terminal 100. That is, the provider server 400 searches for the first terminal 100 corresponding with user identification information of the second terminal 200 among terminals, having connected to a network thereof.

The provider server 400 requests a profile to the first terminal 100 (S132).

The first terminal 100 encrypts a profile that is stored at the authentication module 110 based on a first credential that is shared with the provider server 400 (S140). The first credential in which the first terminal 100 and the provider server 400 share may be a key that uses when the first terminal 100 loads, installs, or manages a profile. The first credential may exist at an embedded authentication module.

The first terminal 100 transmits the encrypted profile to the provider server 400 (S142).

The first terminal 100 disables the profile (S144).

The provider server 400 decrypts a profile based on the first credential that is shared with the first terminal 100 (S150).

The provider server 400 encrypts a profile based on a second credential that is shared with the management server 300 (S152).

Referring to FIG. 2B, the provider server 400 transmits the encrypted profile to the management server 300 (S154).

The management server 300 decrypts a profile based on the second credential that is shared with the provider server 400 (S160).

The management server 300 encrypts a profile based on a third credential that is shared with the second terminal 200 (S162). The third credential in which the management server 300 and the second terminal 200 share may be a key using when the second terminal 200 loads, installs, or manages a profile. The third credential may exist at an embedded authentication module.

The management server 300 transmits the encrypted profile to the second terminal 200 (S164).

The second terminal 200 decrypts a profile based on the third credential that is shared with the management server 300 (S170).

The second terminal 200 installs the profile at the authentication module 210 (S180).

The second terminal 200 executes the profile (S190).

Referring to FIG. 3, the first terminal 100 receives a profile request of a user from the provider server 400.

The first terminal 100 encrypts the profile 10 based on a first credential 20 that is shared with the provider server 400 (S210).

The first terminal 100 transmits the encrypted profile 10 to the provider server 400 (S212). The first terminal 100 disables the profile 10 (S214).

The provider server 400 decrypts the profile 10 based on the first credential 20 that is shared with the first terminal 100 (S220).

The provider server 400 encrypts the profile 10 based on the second credential 30 that is shared with the management server 300 (S222).

The provider server 400 transmits the encrypted profile 10 to the management server 300 (S224).

The management server 300 decrypts the profile 10 based on the second credential 30 that is shared with the provider server 400 (S230).

The management server 300 encrypts the profile 10 based on a third credential 40 that is shared with the second terminal 200 (S232).

The management server 300 transmits the encrypted profile 10 to the second terminal 200 (S234).

The second terminal 200 decrypts the profile 10 based on the third credential 40 that is shared with the management server 300 (S240).

The second terminal 200 executes the profile (S242).

In this way, the user imports the profile of the first terminal 100 to the second terminal 200. The user can safely import the user's personal information that is stored at the first terminal 100 and provider information of a communication provider in which the user subscribes to the second terminal 200 without replacement of an authentication module.

Figure 4B:
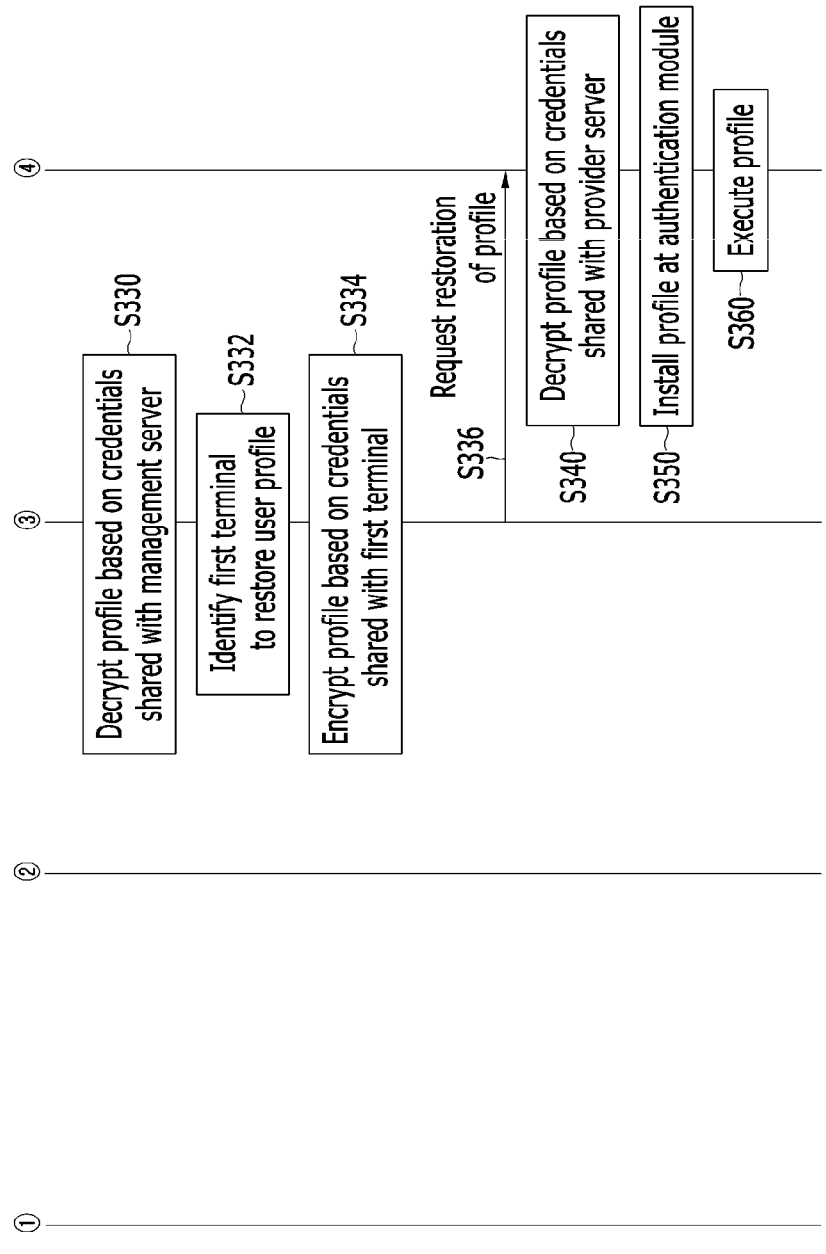
Figure 5:
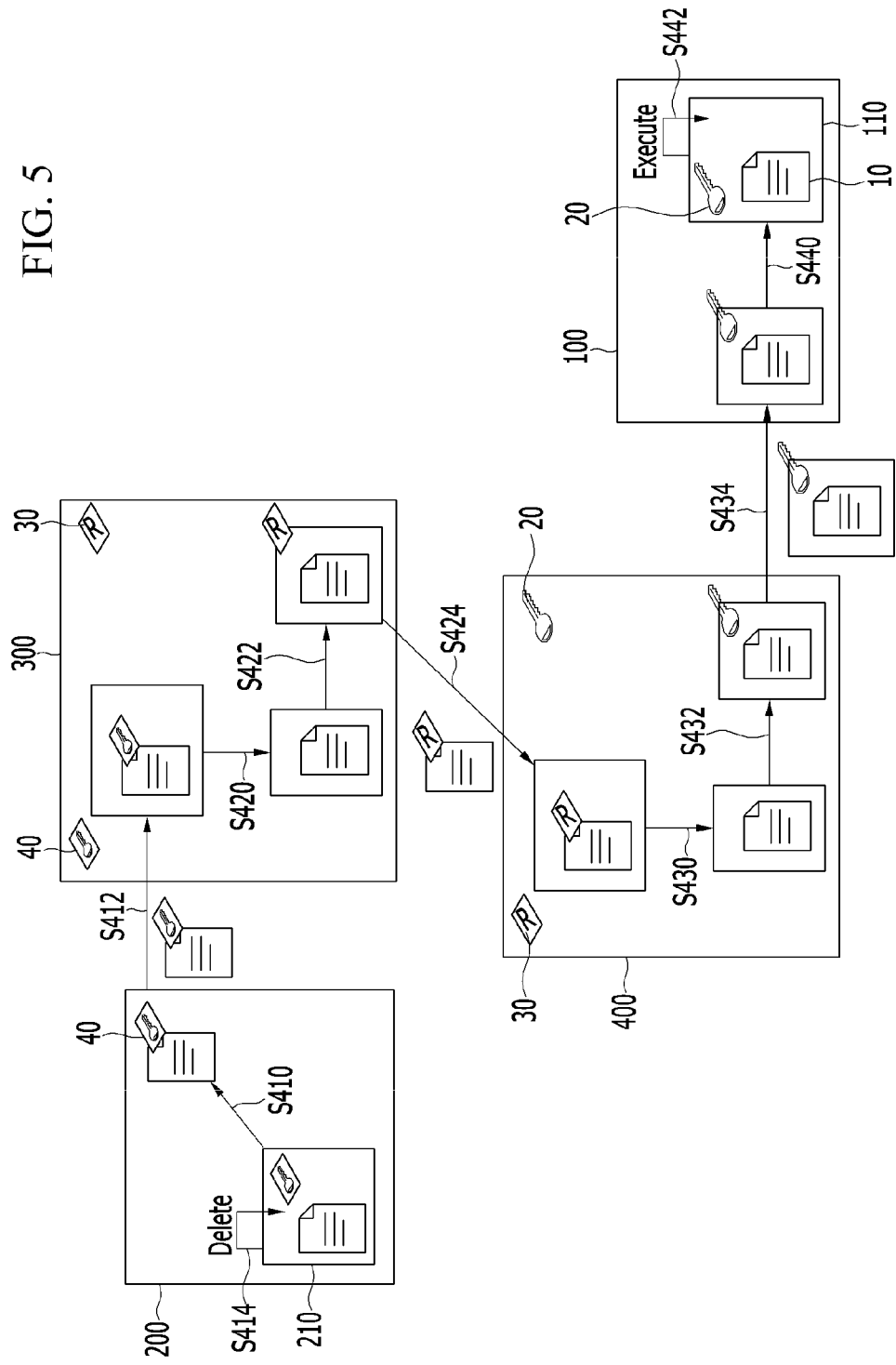

FIGS. 4 and 5 are flowcharts illustrating a method of restoring a profile according to another exemplary embodiment of the present invention.

Referring to FIG. 4A, the user may temporarily use the second terminal 200 that imports the profile and again use the first terminal 100.

The second terminal 200 transmits the stored profile to the first terminal 100 and deletes the stored profile. The first terminal 100 executes the received profile 10. Here, a profile in which the second terminal 200 transmits to the first terminal 100 may be a profile in which partial information such as personal information is updated in a profile in which the second terminal 200 receives from the first terminal 100.

The second terminal 200 encrypts the profile 10 based on a third credential that is shared with the management server 300 (S310).

The second terminal 200 requests restoration of a profile to the management server 300 (S312). The second terminal 200 transmits the encrypted profile 10 and user identification information to the management server 300.

The second terminal 200 deletes the profile 10 (S314).

The management server 300 decrypts the profile 10 based on a third credential that is shared with the second terminal 200 (S320).

The management server 300 determines the provider server 400 in which the user subscribes based on user identification information that is related to profile restoration (S322).

The management server 300 encrypts the profile 10 based on a second credential that is shared with the provider server 400 (S324).

The management server 300 requests restoration of a user profile to the provider server 400 (S326). The management server 300 transmits the encrypted profile to the provider server 400.

Referring to FIG. 4B, the provider server 400 decrypts a profile based on the second credential that is shared with the management server 300 (S330).

The provider server 400 identifies a terminal, i.e., the first terminal 100 to restore a profile (S332).

The provider server 400 encrypts a profile based on the first credential that is shared with the first terminal 100 (S334).

The provider server 400 requests restoration of a profile to the first terminal 100 (S336). The provider server 400 transmits the encrypted profile to the first terminal 100.

The first terminal 100 decrypts a profile based on the first credential that is shared with the provider server 400 (S340).

The first terminal 100 installs the profile 10 at the authentication module 110 (S350).

The first terminal 100 executes the profile 10 (S360).

Referring to FIG. 5, the second terminal 200 encrypts the profile 10 based on the third credential 40 sharing with the management server 300 (S410).

The second terminal 200 requests restoration of a profile to the management server 300 (S412). In this case, the second terminal 200 transmits the encrypted profile 10 to the management server 300 based on the third credential 40.

The second terminal 200 deletes the profile 10 (S414).

The management server 300 decrypts the profile 10 based on the third credential 40 that is shared with the second terminal 200 (S420).

The management server 300 encrypts the profile 10 based on the second credential 30 that is shared with the provider server 400 (S422).

The management server 300 requests restoration of a user profile to the provider server 400 (S424). The management server 300 transmits the encrypted profile 10 to the provider server 400.

The provider server 400 decrypts the profile 10 based on the second credential 30 that is shared with the provider server 400 (S430).

The provider server 400 encrypts the profile 10 based on the first credential 20 that is shared with the first terminal 100 (S432).

The provider server 400 transmits the encrypted profile 10 to the first terminal 100 (S434).

The first terminal 100 decrypts the profile 10 based on the first credential 20 that is shared with the provider server 400 (S440).

The first terminal 100 executes the profile (S442).

Figure 6:
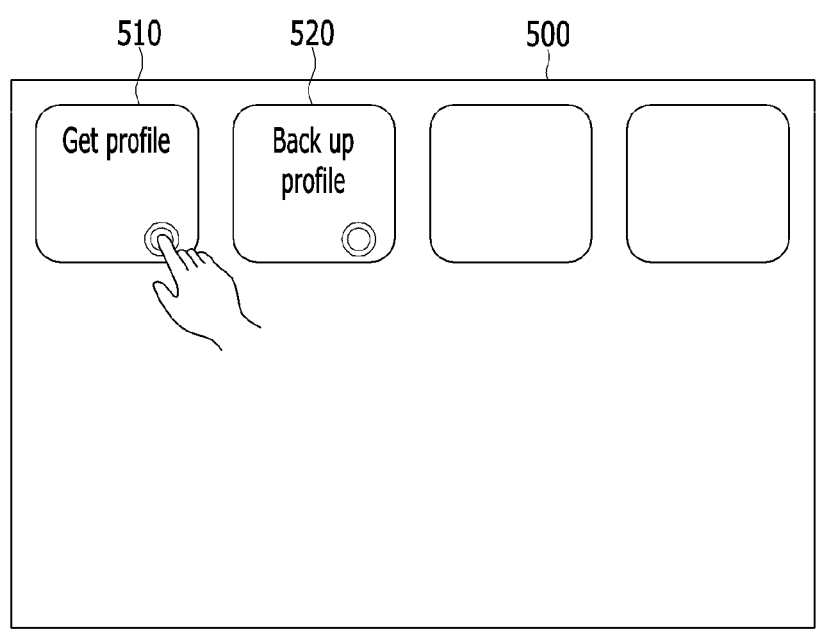
FIGS. 6 and 7 illustrate an application screen for acquiring a profile according to an exemplary embodiment of the present invention.
Figure 7:
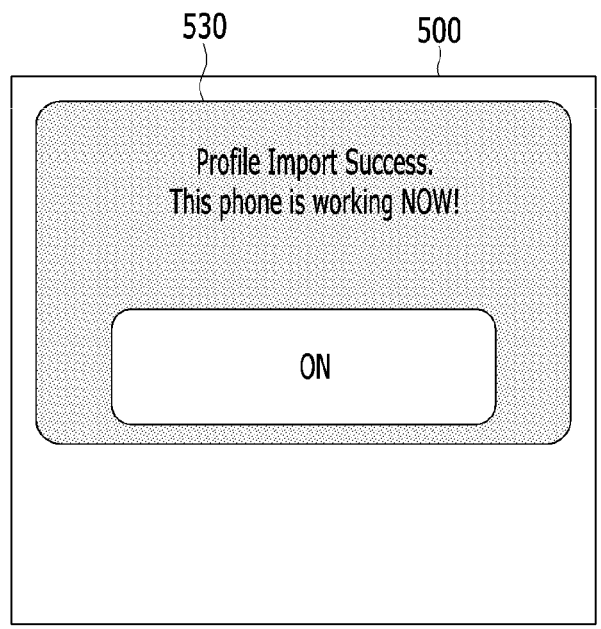

FIGS. 6 and 7 illustrate an application screen for acquiring a profile according to an exemplary embodiment of the present invention.

Referring to FIG. 6, the second terminal 200 provides an application for transferring a profile. When the second terminal 200 executes an application, the application displays a get profile icon 510 and a backup profile icon 520 at a display 500 of the second terminal 200. The application has information for connecting the management server 300.

When the user presses the get profile icon 510, the second terminal 200 requests a profile that is stored at another terminal to the management server 300.

The second terminal 200 decrypts and executes the profile, having received from the management server 300. Therefore, as shown in FIG. 7, the application may display a guide window 530 representing that a profile is imported and the second terminal 200 operates at the display 500.

Figure 8:
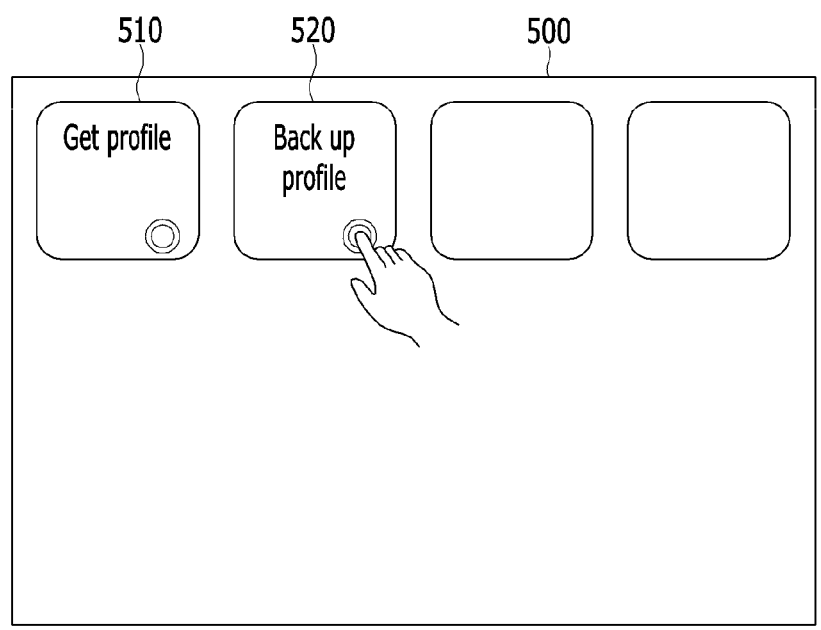
FIGS. 8 and 9 illustrate an application screen for restoring a profile according to an exemplary embodiment of the present invention.
Figure 9:

FIGS. 8 and 9 illustrate an application screen for restoring a profile according to an exemplary embodiment of the present invention.

Referring to FIG. 8, when the user presses a profile restoration icon 520, the second terminal 200 requests profile restoration of the first terminal 100 to the management server 300.

The second terminal 200 deletes a stored profile. Therefore, as shown in FIG. 9, the application may display a guide window 540 representing that a profile is exported and the second terminal 200 does not operate at the display 500.

In this way, according to an exemplary embodiment of the present invention, even if an embedded authentication module cannot be physically detached, the profile can be freely transferred between the embedded authentication modules. According to an exemplary embodiment of the present invention, because a user can import a profile to a desired terminal, a plurality of terminals can be used in the same environment.

An exemplary embodiment of the present invention may be not only embodied through an apparatus and method but also embodied through a program that executes a function corresponding to a configuration of the exemplary embodiment of the present invention or through a recording medium on which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for transferring a profile that is stored at an authentication module, the system comprising:
   a first terminal that comprises a first authentication module and operates based on a user profile that is stored at the first authentication module;
   a second terminal that comprises a second authentication module, and transmits a first message comprising user identification information to request the user profile; and
   a server comprising a management server connected to the second terminal and a provider server connected to the first terminal,
   wherein the management server receives the first message from the second terminal, searches for a provider server in which a user is subscribed, from among a plurality of provider servers, based on the user identification information, and transmits, to the provider server, a second message that requests the user profile corresponding to the user identification information,
   wherein the provider server, in response to receiving the second message, searches for the first terminal based on the user identification information, and transmits, to the first terminal, a third message requesting the user profile corresponding to the user identification information,
   wherein the first terminal transmits the user profile based on the user identification information to the second terminal via the provider server and the management server, and
   wherein the first terminal exports the user profile stored at the first authentication module, and the second terminal installs the user profile received from the server at the second authentication module.

2. The system of claim 1, wherein the provider server transmits the user profile received from the first terminal to the management server.

3. The system of claim 2, wherein the first terminal encrypts the user profile that is stored at the authentication module based on a first credential that the first terminal shares with the provider server and transmits the encrypted user profile to the provider server.

4. The system of claim 3, wherein the provider server decrypts the received user profile based on the first credential.

5. The system of claim 4, wherein the provider server encrypts the decrypted user profile based on a second credential that the provider server shares with the management server and transmits the encrypted user profile to the management server.

6. The system of claim 5, wherein the management server encrypts the user profile based on a third credential that the management server shares with the second terminal and transmits the encrypted user profile to the second terminal.

7. The system of claim 6, wherein the second terminal decrypts the received user profile based on the third credential.

8. The system of claim 1, wherein the first terminal exports the stored user profile to the server, and deletes the user profile from the first authentication module.

9. The system of claim 1, wherein the user identification information comprises personal information of the user and provider information of a communication provider in which the user subscribes.

10. The system of claim 1, wherein the second terminal communicates via a network of the provider server using the installed user profile.

11. The system of claim 1, wherein the user identification information comprises an international mobile subscriber identify (IMSI).

12. The system of claim 1, wherein the user identification information comprises intrinsic identification information of the provider server to which the user is subscribed.

13. The system of claim 1, wherein:
the first terminal comprises a user interface configured to receive user input,
in response to the user input received via the user interface indicating a request to restore the user profile, the first terminal reactivates the user profile and the second terminal deletes the installed user profile.

14. A method for transferring profiles by a profile-storing terminal having a user profile, the method comprising:
receiving, by the profile storing terminal a profile request message, which originates from a profile-requesting terminal and is transmitted via a server;
encrypting the user profile stored at an authentication module based on credentials; and
transmitting the encrypted user profile to the server;
wherein the profile request message is sent by the profile-requesting terminal to the server and from the server to the profile-storing terminal,
wherein the server comprises a management server connected to the profile-requesting terminal and a provider server connected to the profile-storing terminal, and
wherein the method further comprises:
searching, by the management server, for the provider server based on user identification information comprised in the profile request message originated by the profile-requesting terminal;
transmitting, by the management server, a message that requests the user profile corresponding to the user identification information to the provider server, and
searching, by the provider server, for the profile-storing terminal based on the user identification information.

15. The method of claim 14, wherein the credentials are a key in which the profile-storing terminal uses for loading, installing, or managing the user profile.

16. A method for transferring profiles by a profile-requesting terminal requesting a user profile, the method comprising:
transmitting a first profile request message comprising user identification information to a management server of a server which further comprises a provider server;
searching, by the management server, for the provider server from among a plurality of provider servers, based on the user identification information;
transmitting, by the management server to the provider server, a second profile request message that requests the user profile corresponding to the user identification information;
searching, by the provider server, for the profile-storing terminal based on the user identification information;
transmitting, to the profile-storing terminal by the provider server, a third profile request message that requests the user profile corresponding to the user identification information;
receiving, by the profile-requesting terminal an encrypted user profile from the profile storing terminal via the server;
decrypting the encrypted user profile based on credentials that are shared with the server; and
installing the decrypted user profile at an authentication module of the profile-requesting terminal.

17. The method of claim 16, further comprising:
encrypting the user profile that is stored at the authentication module based on the credentials for profile restoration shared with the profile-storing terminal;
transmitting a profile restoration message to the server; and
deleting the user profile that is stored at the authentication module,
wherein the profile restoration message comprises the encrypted user profile and the user identification information.

* * * * *